US006199508B1

(12) United States Patent
Miale et al.

(10) Patent No.: US 6,199,508 B1
(45) Date of Patent: Mar. 13, 2001

(54) ANIMAL LIFT AND TRANSPORT APPARATUS

(75) Inventors: Theresa Miale, P.O. Box 3718, Rancho Sante Fe, CA (US) 92067; Gloria L. Miale, Rancho Santa Fe, CA (US); Michael Molvaney, Del Mar, CA (US); William Pantos, Carlsbad, CA (US)

(73) Assignee: Theresa Miale, Rancho Cucamonga, CA (US)

(*) Notice: Subject to any disclaimer, the term of this patent is extended or adjusted under 35 U.S.C. 154(b) by 0 days.

(21) Appl. No.: 09/102,293

(22) Filed: Jun. 22, 1998

(51) Int. Cl.[7] .............................. A01K 29/00; A47B 7/00
(52) U.S. Cl. .............................. 119/28.5; 119/727; 5/611
(58) Field of Search .............................. 119/28.5, 724, 119/725, 726, 727, 728; 5/611, 616, 610, 621; 296/20

(56) References Cited

U.S. PATENT DOCUMENTS

| | | | | |
|---|---|---|---|---|
| 214,224 | | 4/1879 | Winters . | |
| 2,976,840 | * | 3/1961 | Hugus | 119/727 |
| 3,110,476 | | 11/1963 | Farris . | |
| 3,245,366 | | 4/1966 | Fox . | |
| 3,282,566 | | 11/1966 | Clarke . | |
| 3,640,520 | * | 2/1972 | Wieland et al. | 5/610 |
| 3,644,944 | | 2/1972 | Bourgraf et al. . | |
| 3,686,696 | * | 8/1972 | Lanigan | 5/611 |
| 3,700,229 | * | 10/1972 | Kurokawa et al. | 5/621 |
| 3,740,778 | | 6/1973 | Jordan et al. . | |
| 3,805,712 | | 4/1974 | Taylor et al. . | |
| 4,097,941 | | 7/1978 | Merkel . | |
| 4,227,269 | * | 10/1980 | Johnston | 5/616 |
| 4,558,847 | | 12/1985 | Coates . | |
| 4,579,381 | * | 4/1986 | Williams | 296/20 |
| 4,796,565 | * | 1/1989 | Charbeneau | 119/727 |
| 4,911,106 | * | 3/1990 | Goodwin | 119/724 |
| 5,337,428 | * | 8/1994 | Krauska et al. | 5/611 |
| 5,575,026 | * | 11/1996 | Way et al. | 5/611 |
| 5,752,473 | * | 5/1998 | De Roovere | 119/728 |
| 5,823,146 | * | 10/1998 | Alaniz et al. | 119/725 |
| 5,842,443 | * | 12/1998 | Steinfort | 119/726 |
| 5,960,739 | * | 10/1999 | Storm | 119/28.5 |
| 5,987,673 | * | 11/1999 | Smith | 5/611 |
| 6,089,192 | * | 7/2000 | Gent | 119/724 |

FOREIGN PATENT DOCUMENTS

| | | |
|---|---|---|
| 196 813 | 6/1938 | (CH) . |
| 18 10 628 | 9/1970 | (DE) . |
| 526 711 | 9/1940 | (GB) . |
| 887 994 | 1/1962 | (GB) . |
| 2 078 529 | 1/1982 | (GB) . |

* cited by examiner

*Primary Examiner*—Charles T. Jordan
*Assistant Examiner*—Elizabeth Shaw

(57) ABSTRACT

An apparatus for use in transporting and lifting immobile large animals. It has two major cooperating components: a cart and a lift. Both have tubular frame constructions with fabric releasably attached to the frames for supporting an animal. The cart has large wheels for maneuverability even over rough terrain to an animal needing care. The fabric can be unsnapped from the cart frame to more easily load the animal. The legs can be pivoted outward, allowing the cart to be lowered to the ground for greater ease in loading an animal. The cart, with the loaded animal, fits over a lowered lift. The lift has an upper frame which can be raised to bring the supported animal to a desired level. It has wheels on its base frame to allow it to be wheeled to a desired location. Two separate motor-driven lifting mechanisms are used to raise the upper frame, capable of lifting up to 300 pounds. Belts are provided to secure an animal on the lift. A quick-lift feature disengages the drive gears permitting the upper frame to be manually lifted to desired horizontal or tilted position. A resuscitation board can fit into a pocket beneath the lift's fabric sheet to provide a stiff backing for emergency CPR. In its lowered position the lift can be moved suitcase-style on wheels. A battery and battery charger are mounted with the lift motors on the lift base.

25 Claims, 3 Drawing Sheets

ANIMAL LIFT AND TRANSPORT APPARATUS

BACKGROUND OF THE INVENTION

This invention relates in general to the field of wheeled litters for transporting immobile large animals, and more particularly to such litters which can be collapsed very close to ground or floor level to facilitate placing an animal thereupon, and subsequently raised under power or manually for transporting and transferring the animal to a treatment table.

Lifting and transporting an immobile, injured or sick large animal without causing the animal discomfort or aggravating an injury is difficult. So an apparatus for lifting and transporting large animals in comfort is needed. (As used in this document, the word "large" includes animals of about seventy-five pounds or more but refers in general to animals which, if sick or injured or disabled due to age or some other reason, are large enough to present lifting and transportation difficulties to a handler.) Particularly for veterinarians, animal clinics, animal hospitals, humane societies, canine units and zoos, there is an urgent need for such an apparatus.

With this invention, large immobile animals can be lifted and transported with relative ease and without causing further injury or unnecessary discomfort to the animal. It provides a way for a single person of ordinary strength to lift a very large, prone animal from the ground or floor and transport it. A significant advantage is that this invention has two components, a wheeled cart and a wheeled lift. The cart is light-weight so it can easily be carried over the rough terrain. The cart is also easily maneuverable to transport an animal over the rough terrain to the lift which is more suited for smoother surfaces. The cart can be rolled over the lift and carried by the lift without the need to transfer the animal from the cart to the lift. Preferably the lift is designed to elevate an animal weighing up to 300 pounds to a level of approximately 40 inches. This is sufficient to allow treatment to be conducted on a large animal while it remains on the lift, or the animal can be easily transferred therefrom to a treatment table. In its lowered or collapsed position the lift is compact, allowing it to be easily stored in a vehicle.

Other advantages and attributes of this invention will be readily discernable upon a reading of the text hereinafter.

SUMMARY OF THE INVENTION

An object of this invention is to provide an animal lift and transport apparatus for large animals.

An additional object of this invention is to provide an animal lift and transport apparatus for immovable, injured or sick animals without causing further injury or discomfort to such animals.

An additional object of this invention is to provide an animal lift and transport apparatus which has both a lift and a cart.

An additional object of this invention is to provide a lift capable of lifting animals weighing up to 300 pounds.

An additional object of this invention is to provide a lift capable of being lowered or compressed to eight inches in height, or less.

An additional object of this invention is to provide a lift having a battery powered lifting mechanism.

An additional object of this invention is to provide a gear driven collapsible lift having a quick-lift feature which disengages the drive gear permitting the lift to be quickly, manually expanded upward to a desired level and/or tilt.

An additional object of this invention is to provide a lift and a cart each having a detachable, flexible sheet for resting an animal thereon.

An additional object of this invention is to provide a lift having a flexible sheet which can be stiffened to allow CPR to be performed on a supported animal.

An additional object of this invention is to provide a lift capable of being rolled on an edge when collapsed.

An additional object of this invention is to provide a cart capable of transporting an animal over rough terrain.

An additional object of this invention is to provide a foldable cart capable of being positioned over a collapsed lift.

An additional object of this invention is to provide a lift capable of lifting an animal on the cart.

These objects, and other objects expressed or implied in this document, are accomplished by an apparatus having two major components: a lift and a cart. In the preferred embodiment, the cart has a rectangular framework with a fabric sheet stretched between, and connected to, opposite long frame members for vertical support of the animal. The cart has two wheeled legs supporting a rear end, and a handle at a front end for pulling and maneuvering the cart. The cart preferably also has front legs extending from the frame to support the frame parallel to a floor or ground surface. For a prone, disabled or sick animal, the fabric sheet can be disconnected from the frame and pulled underneath the animal. The frame of the cart can then be placed over the animal and the sheet can be reconnected. Once the sheet is reconnected to the frame, straps attached to the sheet can be connected around the animal to hold it in place. Once the animal is secured on the sheet by the straps, the cart can then be carried to the lift. Alternatively the cart can then be raised onto its wheels and front legs and wheeled to the lift.

Preferably the lift has a base and a lift framework including a motor driven elevator mechanism for selectively raising and lowering the lift frame from the base. The base has wheels near its corners for stability and maneuverability. An optional quick-lift feature disengages the motor drive so that the lift frame can be quickly lifted manually by its handles to a selected level horizontally or at a selected tilt. As for motor drive, the lift preferably has two battery operated motors, each controlling an opposite end of the lift frame but acting in unison to keep it parallel to the floor within its operating range. Preferably a battery and a battery charger are mounted on the base. The lift frame has a flexible sheet upon which an animal can lie, and the sheet can have a second layer attached to its underside, forming a large pocket to allow the insertion of a rigid resuscitation board. This provides rigid support so cardio-pulmonary resuscitation (CPR) can be administered to an animal in distress.

Preferably the frame of the cart is wider than the lift frame and base so that the cart can be wheeled over the lift when the lift is in its lowest position. The lift frame can then be raised, with the cart and animal on top, without having to move the animal from the cart to the lift. The lift can then be wheeled to a desired location, and the animal can then be lifted or lowered to the level needed. Treatment can be given to the animal while on the lift. Alternatively, the cart, since it is separate from the lift, can again be used to transport the animal from the lift to an operating table. This avoids the necessity of having to lift just the animal and the possible additional injury and discomfort it could cause. Also, the support sheet of the cart can be disconnected from the cart, allowing the animal to remain on the sheet on the treatment table while the cart is removed to get it out of the way.

DESCRIPTION OF THE PREFERRED EMBODIMENT

Figure 1:
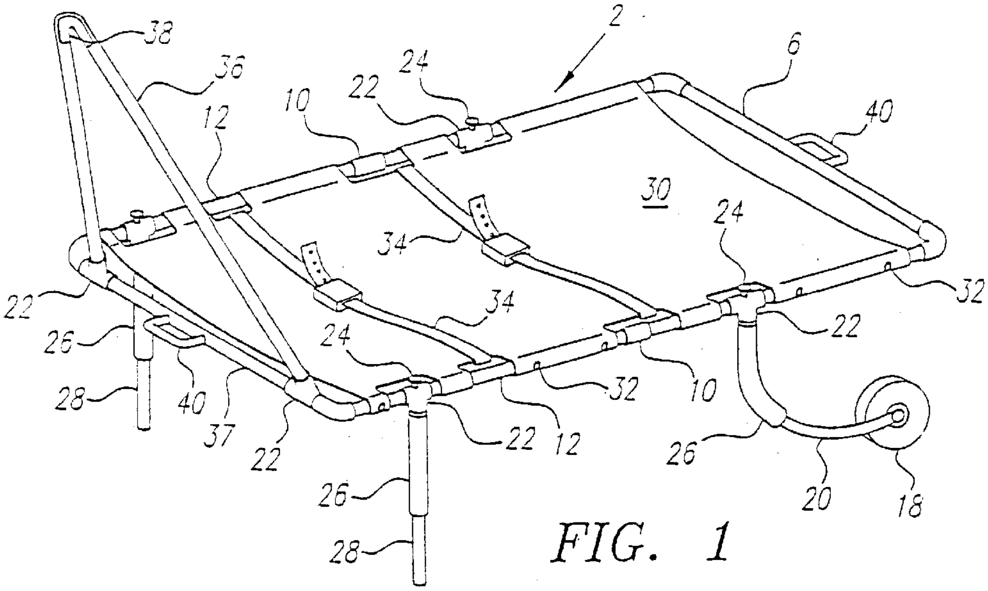
FIG. 1 is a pictorial view of the cart component of this invention.

Referring to FIGS. 1, 2, 5 and 6, this invention has two independent, but cooperating components: a cart generally designated by the number 2, and a movable elevator (hereinafter referred to as the "lift") generally designated by the number 4. Both the lift and the cart preferably have a tubular metal frame construction for reduced weight. As illustrated, both are essentially the same length, but the frame of the cart is wider than the lift. This allows the cart to be maneuvered over the frame of a lowered lift with an animal on the cart. The lift can then be raised, lifting the cart and thus the animal, eliminating the need to transfer the animal from cart to lift.

Referring to FIGS. 1–4, the cart 2 has a polygonal frame 6 in the preferred shape of a rectangle. Preferably, structural tubular aluminum is used because of its light weight, and it allows the frame to be easily fabricated. Three-quarter inch, schedule 40 aluminum pipe, with a clear anodize coating is used in the preferred embodiment and will adequately lift and support the weight of a 300 pound animal. The frame may also be constructed of other rigid structural materials. The long sides of the frame 6 are made each of two equal lengths of tubing, 7A and 7B, joined by a vertically-pivoting knuckle joint 8. The joint is shown both locked (FIG. 4) and unlocked (FIG. 3) by a slidable sleeve 10. The knuckle joint has a fork and a tongue therebetween pinned together to allow the joint to be pivoted about the pin. The outer diameter of the joint is preferably the same as that of the frame sides so that the locking sleeve can slide over the joint. To lock a joint, the sleeve 10 is moved over the pivoting joint until it engages a locking pin 14 in an L-shaped channel 16 defined at an end of the sleeve. The sleeve is locked in place by twisting it so that the pin is caught in the base leg of the "L." The locking sleeve may be constructed of a strong, rigid plastic material, as well as metal pipe or tubing. The joints allow the cart frame to be folded in half for storage and more convenient carrying.

Figure 2:
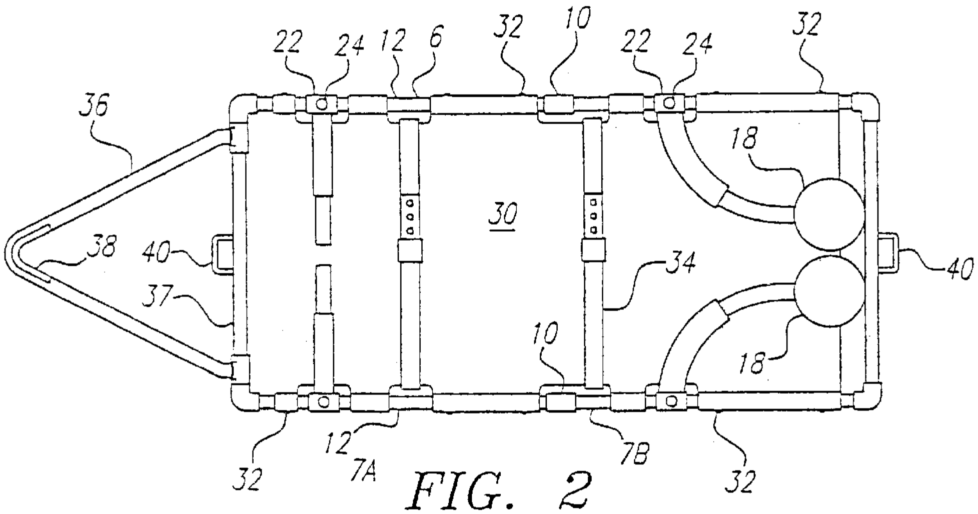
FIG. 2 is a plan view of the cart component.
Figure 3:
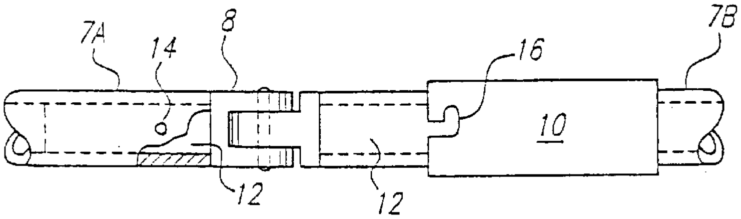
FIG. 3 is a top view of a vertically pivoting joint in a long side of a cart frame.
Figure 4:
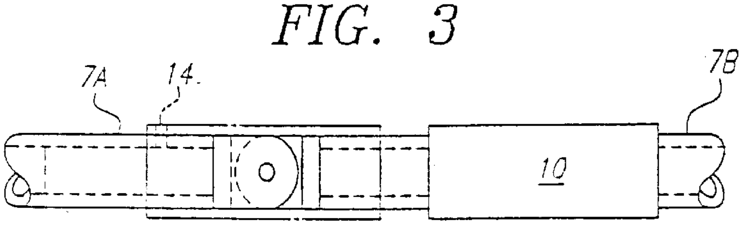
FIG. 4 is a side view of the joint of FIG. 3.

Referring to FIGS. 1 and 2, the cart 2 has two wheels 18. As used in this document the term "wheel" means any kind of wheel in general as well as casters, and the like. Each wheel is rotatably attached to the end of a respective curved leg 20. The curved leg may be constructed of the same material as the frame. Each curved leg is connected to a rotable sleeve 22 installed over a respective side member of the frame 6 on opposite sides of the frame. The sleeves are disposed a distance away from the end of the frame so that the wheels are disposed under the end for further leverage. Each rotatable sleeve 22 includes a detent pin 24 which protrudes through a hole in the sleeve to lockingly engage a hole (not shown) defined by a respective side member. When the curved legs are in vertical planes below their respective side members, the detent pins will engage the locking holes, to lock the wheels and their legs in place for supporting and maneuvering the cart. When the detent pins are raised out of their locking holes, the legs are free to rotate axially about their respective side members. When wheels are pivoted horizontally outward, the cart frame can be laid flat on the ground to make it easier to place an animal thereon. The legs can also be rotated to an essentially horizontal position above the cart (as shown in FIG. 2), where they can be locked in position by the detent pins in second locking holes in the side members. Alternatively, the legs can be rotated to a generally horizontal position below cart, and locked there by corresponding detent holes. This minimizes the cart for storage. Other detents for locking the sleeves 22 can be used, including a spring-biased sleeve which can be released by pulling on the leg. Since the legs can be rotated to a position above the frame, a cushioning sleeve 26 can be installed over the curved legs to prevent an injured animal that is being transported on the cart from having direct contact with the hard legs.

Referring again to FIGS. 1 and 2, straight support legs 28 are affixed to a pair of rotatable sleeves 22 installed over the side members of the frame 6 near the front of the cart. The operation of the straight legs and their rotatable sleeves is similar to that for the curved legs 20. With detent pins 24 engaged in locking holes (not shown) when the legs are vertical, the cart frame 6 will be supported by them. The detent pins can also be disengaged, allowing the legs to be rotated horizontally outward for placing the cart flat on the ground. The straight legs can also be pivoted into an essentially horizontal position above the cart, as shown in FIG. 2, or alternatively below the cart. In this position they can be locked in place by the detent pins engaging additional locking holes (not shown) for compact storage. A cushioning sleeve 26 can also be installed over the upper end of the leg.

Referring again to FIGS. 1 and 2, a flexible support sheet 30 is stretched between to the sides of the frame by quick-release snaps 32 affixed along the lateral margins of the sheet. The snaps engage with mating portions affixed along the outsides of the frame side members. The support sheet can be made of canvas but is preferably a similar material which has been covered or coated by a vinyl or similar material to allow the support to be easily cleaned and disinfected. Cutouts in the edges of the sheet avoid interference with operation of the rotatable sleeves 22 and locking sleeves 10. Belts 34, preferably having quick-release fasteners such as opposing hook and loop strips, are disposed at appropriate locations along the frame to strap an animal onto the sheet. The ends of the belts are affixed to the sides of the support sheet. This allows the support sheet to be removed from the frame for use away from the cart and still have the belts secured around an animal. The belts can also be used as handles or straps to allow the sheet to be more easily moved into a position where it can be attached to the cart. Or, with the sheet positioned in an accessible location, the cart can be maneuvered to the sheet. Its legs can be pivoted to a horizontal position, allowing the frame of the cart to be placed on the ground around the animal and the sheet. The sheet can then be reattached by the snaps to the frame of the cart.

Referring again to FIGS. 1 and 2, a pivoting handle 36 is connected to the front of the frame 6. The handle is connected by rotatable sleeves 22 which are installed over the front end member of the frame. The handle can be made from the same material as the frame. A detent pin installed in the sleeve and locking holes in the end member of the frame (not shown) can be used to lock the handle in selected positions. A grip 38 attached to a forward bend of the handle provides an improved hand-hold for easier control of the cart. The grip is preferably a molded plastic or rubber material attached to the inner curve of the bend but could also be a piece of cushioning sleeve placed over the bend area. Two handles 40 can also be affixed at opposite ends of the frame for use in lifting or carrying the cart over obstacles.

To allow the cart to be used over a wide variety of terrains, the wheels are relatively large and wide, preferably approximately six inches in diameter by three inches wide. The wheels are preferably soft rubber or pneumatic construction to provide as much cushioning as possible. The curved legs also help prevent the cart from being caught as it is being pulled through brush or over obstacles.

Figure 5:
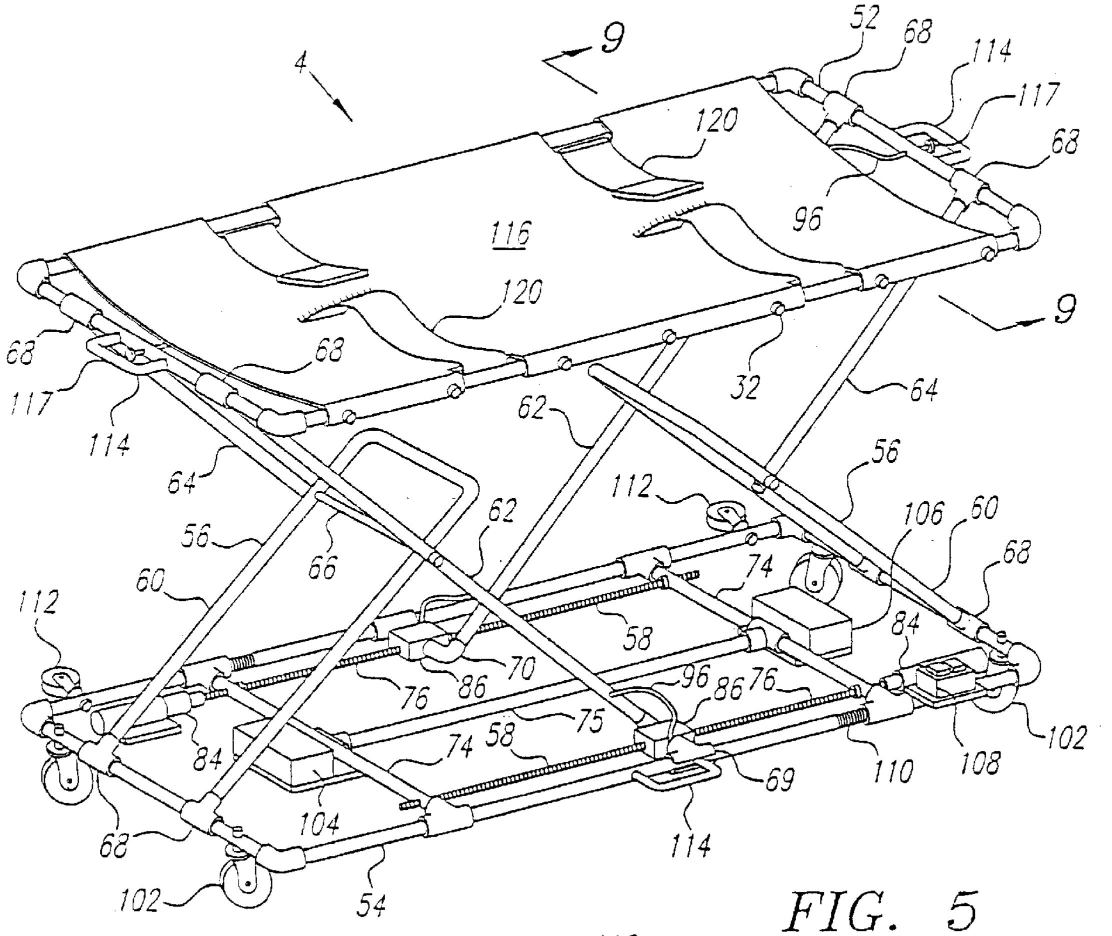
FIG. 5 is a pictorial view of the lift component of this invention shown in a partially raised position.
Figure 6:
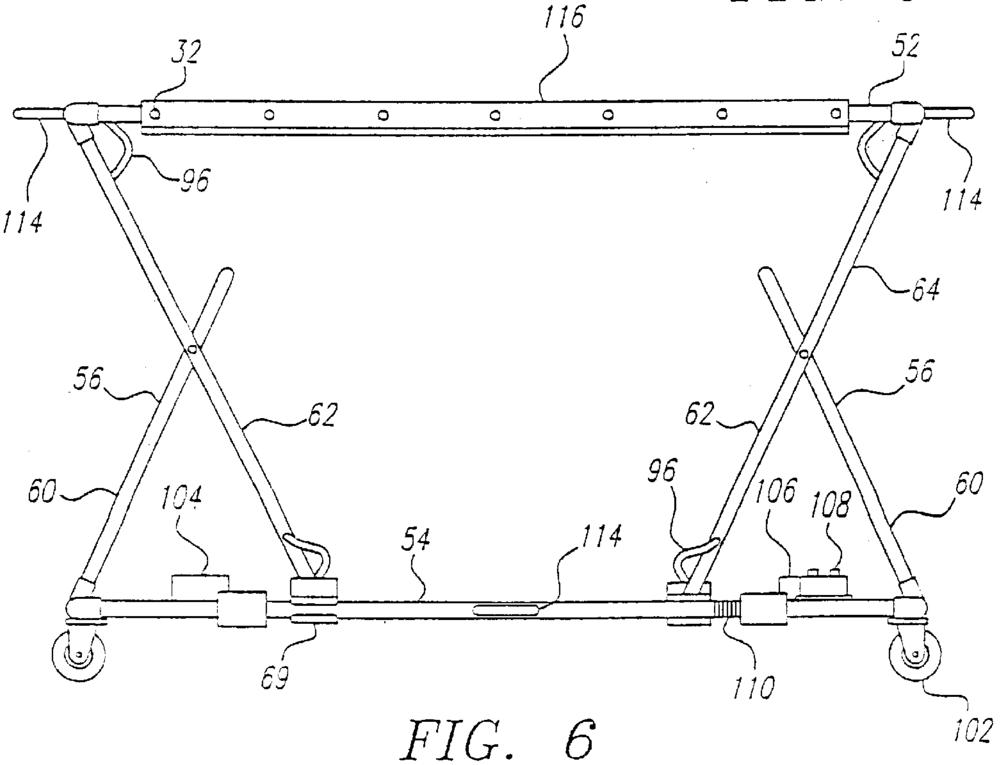
FIG. 6 is a side view of the lift in its raised position.

Referring to FIGS. 5 and 6, the lift 4 also preferably has a strong but light-weight construction, e.g. aluminum. The lift has a lift frame 52, a base 54 and two sets of lifting mechanisms 56 which space the lift frame from the base, and allow it to be raised and lowered by drive mechanisms 58 mounted on the base. The lift frame and the base also each have a generally rectangular shape. As in the cart, they are preferably constructed of three-quarter inch, schedule 40 aluminum pipe, with a clear anodize coating. While the lift will perform satisfactorily with frames of a variety of sizes, the frames for the lift are preferably eighteen by fifty four inches for its primary use in assisting with animal care at animal hospitals, clinics and veterinarian offices.

Referring to FIGS. 5–8, a pair of lifting mechanisms 56 raise and lower the lift frame from the base, and are preferably made of the same metal tubing. Each of the lifting mechanisms has a prop member 60, a lift arm 62, an auxiliary lift arm 64, a pivot pin 66, rotatable couplings 68 connecting the lift arm and auxiliary lift arm to respective end of the lift frame, an elbow coupler 70 at the base of the lift arm, a drive link 72, and a “T” slide 69. The prop 60 is a generally U-shaped tubular frame. The free ends of the prop are pivotally connected to an end of the base by rotatable couplings allowing the prop member to pivot outwardly up and down with respect to the base. Proximate the top of the prop member is a pivot pin 66 extending through holes defined by the sides of the prop member and a hole defined at or about the midpoint of the lift arm 62. The pin 66 also extends through a hole defined by the auxiliary lift arm 64. The pin is secured by standard means so that it stays in place. The auxiliary lift arm, vertically propped by member 60, works with the lift arm 62 to support their respective end of the lift frame. Basically each lift arm is a stiff leg which drives a coupled articulated leg, namely the auxiliary lift arm and the prop.

Figure 7:
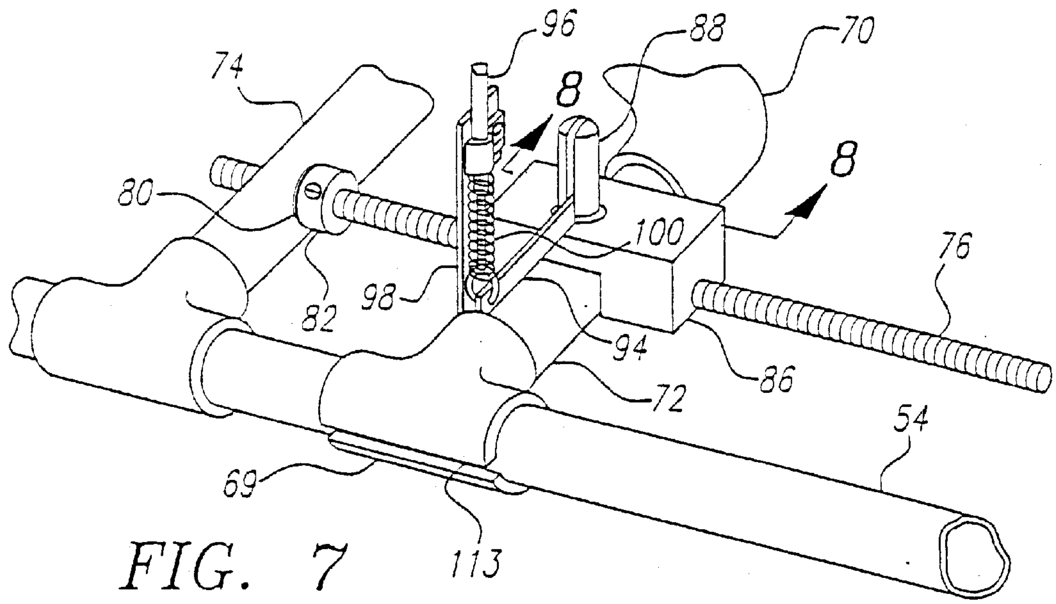
FIG. 7 is a partial pictorial view of a lift drive mechanism.

Referring to FIGS. 5 and 7, the lower end of each lift arm 62 is slidably connected to the base via the lift arm’s connection to elbow 70 and drive link 72, the latter of which is connected to a base leg 54 by means of a T-slide 69. As will be described in more detail below, the T-slide 69 has a slot 113 in order to prevent interference with a handle 114. The drive link 72 freely rotates in the elbow 70. Two cross members 74 run laterally between opposite side members 54 of the base. The cross members are disposed near opposite ends of the base, each just beyond respective extents of travel of the T-slides 69.

Referring to FIGS. 5–7, drive mechanisms 58 used to power the two lifting mechanisms 56 each have a screw gear 76, a bushing 78, two thrust bearings 80, two locking collars 82, a drive motor 84 and a drive block 86. The screw gears 76, are free to turn in bushings 78 disposed in holes through the lift arm drive links 72. Likewise, the screw gears are inserted through, and are free to turn in, thrust bearings 80 disposed in holes through the lateral braces 74. Locking collars 82 secured to the screw gears at the lateral braces 74 keep the screw gears in place. Drive motors 84 are mounted on respective brackets attached to opposite corners of the base. The drive motors can be attached to respective screw gears at the same end or at opposite ends of the base.

Figure 8:
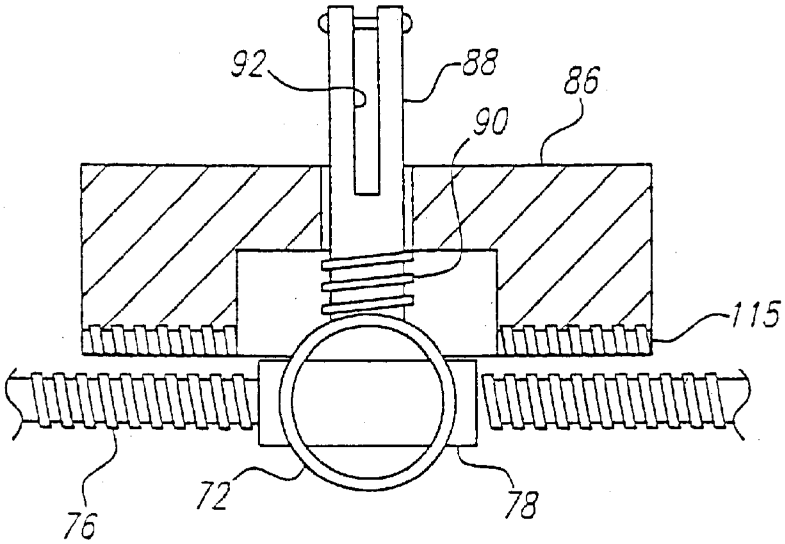
FIG. 8 is a cross-sectional view taken along line 8—8 of FIG. 7.

Referring to FIGS. 7 and 8, each drive block 86 has a generally “C” shaped longitudinal cross-section and has screw threads 115 defined in a down-facing screw gear channel. The threads correspond with the threads of the screw gear, and when the drive block is lowered onto the screw gear, the threads engage. A post 88 extends vertically through a hole disposed in the center of each drive block, perpendicular to the axis of the block’s threads. A coil spring 90 is disposed over the lower end of the post in a gap between the two legs of the drive block. The spring floats on the lower end of the post which rests on top of the drive link 72. The coil spring 90 pushes up on the underside of the drive block, biasing it so the block is disengaged from the screw gear. A slot 92 runs vertically through the upper half of the post. A release arm 94, preferably L-shaped, is disposed in the slot with the short leg of the “L” pointing upward and pinned near its end by a pin through the top of the post. The slot 92 is long enough for the short leg of the release arm 94 to pivot to a vertical position and be within the slot. The length of the short leg of the release arm is such that when the release arm is pivoted downward, the bottom corner of the release arm contacts the top surface of the drive block and pushes it downward, overcoming the upward biasing force of the coil spring 90, to engage the drive block 86 with screw gear 76. In this position, the release arm will hold the drive block so that its screw threads remain engaged with the screw gear.

In operation, the lower end of each stiff leg, i.e. lift arm, is slidably coupled to a track mounted on the base, namely a base side member, the lower end being moveable between opposite ends and the track’s range as limited by the cross braces. At a first end, the stiff leg is lying down against the base, but at a second end the stiff leg is as upright as it can get.

Referring to FIGS. 5 and 7, release cables 96 extend through respective ends of the lift frame 52. The release cables each have a wire slidably enclosed in a flexible sheath, and each have a control knob 117 attached to a free end of the wire. The knobs are adjacent respective end members of the lift frame. Each cable is routed to the nearest lift arm 62. The cables can be routed alongside their lift arms to a respective drive block 86, but preferably they are routed through the insides of the lift arms. This will shield the cable and protect it from becoming snagged or caught on objects over the span of its length. This will also preclude the necessity of cable ties or clamps which would otherwise be needed to secure the cable to the lift arm to prevent it from becoming snagged on objects. The lower end of each cable is secured by clamps, or equivalent, to a cable mounting bracket 98 attached to respective lift arm drive links 72. At the lower end of each release cable, the flexible sheath is trimmed to allow the enclosed wire to be connected to the end of the long leg of a respective release arm 94. A coil spring 100 is disposed over each cable wire end biases the release arm downward which in turn holds the drive block 86 in a lowered position with its threads engaged with the screw gear 76.

Referring again to FIGS. 5 and 7, pivoting wheels 102 extending beneath the base near its corners allow the lift to be easily moved and maneuvered. A battery 104 is mounted on a bracket secured approximately in the center of a lateral brace 74 to prevent interference with the lift mechanism. A battery charger 106 is likewise secured to a mounting bracket attached near the center of the other lateral brace so that it does not interfere. Foot switches 108 for operating the drive motors 84 are mounted on the base, preferably adjacent to a drive motor. The foot switches can be mounted on both sides of the base to allow operation from either side. Wiring (not shown) interconnects the battery, battery charger, drive motors and foot switches. The wiring can conveniently be routed between the electrical components by means of the hollow tubing of the braces 74, 75 and side members 54 where needed. This will protect the wiring from becoming entangled on objects and will present a neater, cleaner appearance. An AC line cord (not shown) is attached to the battery charger 106 to allow it to be plugged into an available AC outlet for recharging the battery 104.

Referring to FIGS. 5 and 6, a pair of coil springs 110 are disposed around respective side members 54 of the base between lateral braces 74, nearest drive motors and lift arm slides 69. When the lift is in its lowered position, with the lift frame 52 lowered to a point near the base, the link arms 72 will be in their most retracted position. In this position, the slides 69 will compress respective springs 110. When the drive motors are actuated to raise the lift, the springs act to provide an initial starting force to drive the lift arms up. This initial push assists the drive motors 84 in overcoming the reduced leverage of the lifting mechanism 56 in their extreme lowered position, after which the drive motors can easily move the lifting mechanisms to raise and lower the lift frame. The springs also cushion the initial force to the links 72 by the screw gears and provide balance between the two links so they can each be moved together, allowing for both ends of the lift frame to be raised together, maintaining a level orientation.

For convenience when the lift is in its lowered or compressed configuration, it can be rolled on edge, suitcase style, on wheels 112 attached to the outward side of one of the side members of the base. A handle 114 is attached in the same plane on the opposite side of the base. Because of this handle, the slide 69 must be slotted (see FIG. 7) in order to avoid interference with the handle.

An additional handle 114 is preferably attached to each of the end members of the lift frame for convenience when manually raising the lift and for maneuvering the lift 4.

Referring to FIGS. 5–8, the lift has a quick-lift feature which allows the lift frame 52 to be quickly, manually lifted to a desired level or to a position where one end of the upper frame is at a different level than the other. This is accomplished by pulling on the knobs 117 at the ends of the release cables 96 to cause the long legs of the release arms 94 to be lifted by the wire in the cable attached to the knob. This causes the release arms to pivot in their posts 88, removing the downward forces of the release arms from the top of the drive blocks 86. However, when there is a load on the upper frame, the threads of the drive blocks will remain engaged with the screw gears 76, overcoming the upward bias of the coil springs 90, so the upper frame will maintain its position and will not inadvertently fall. But when the load is released, as by manually lifting the upper frame, preferably by use of the handles 114, the load is released from the engaged threads of the drive blocks and the screw gears. With the load released, the springs 90 are then free to lift the drive blocks from the screw gears. With the threads no longer engaged, the lift frame is free to be manually lifted or lowered quickly, without having to wait for the screw gears to move the lifting mechanisms. When the lift frame is manually lifted to its desired position, the knobs of the release cable 96 can be released which will allow the cable springs 100 to push the long legs of the release arms 94 downward, causing the release arms to pivot in posts 88 and push the drive blocks 86 downward, overcoming the upward bias of the lift springs 90. This will cause the threads of the drive blocks to again engage the threads of the screw gears 76, and the release arms and engaged load will hold the drive block threads engaged with the screw gears. The lift frame will thus maintain its new manually selected position, even if one end of the lift frame is positioned at a different level than the other end. From this position further adjustment may be made by the drive mechanisms 58 by use of the foot switches 108, or by further manual positioning, by releasing the drive blocks as previously described. When use of the lift has been completed after manually positioning the lift frame, it should be manually levelled again. This can be accomplished by releasing the drive blocks, as described, and manually lowering the lift frame to its compressed position so that the mechanisms will once again be ready to raise the lift frame in a level orientation.

Figure 9:
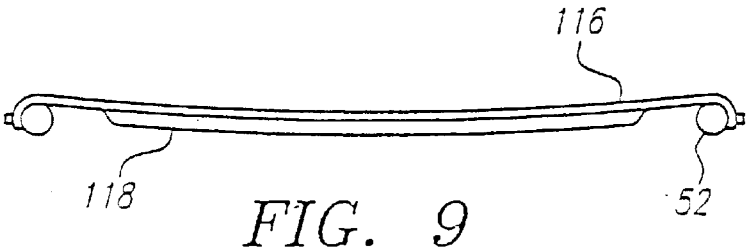
FIG. 9 is a cross-sectional view taken along line 9—9 of FIG. 5.

Referring to FIGS. 5, 6 and 9, a flexible support sheet 116 similar to the support sheet 30 of the cart, is attached to the side members of the lift frame by a plurality of quick release snaps 32 attached near the edges of the support. The snaps engage with mating portions of the snaps which are attached near the outward sides of the frame. This sheet is made of the same material as the sheet for the cart and can easily be replaced, cleaned and disinfected. The flexible support 116 is used for resting an animal thereupon. As more clearly shown in FIG. 9, the flexible support has an additional layer of flexible material attached to its underside to form a pocket 118. A resuscitation board (not shown), e.g. a thin rigid board, can be slid into the pocket so that CPR can be performed on an animal, if necessary, since the board provides a rigid support for the procedure. Belts 120 preferably having quick release fasteners (e.g. hook and loop) are disposed at appropriate locations along on the flexible support 116 to aid in securing an animal in position on the lift 4. The ends of the belts are attached at edges of the flexible support. As is the case for the flexible support 30 of the cart 2, this allows the flexible support 116 to be removed from the upper frame 52 for use away from the lift and still have the belts attached to help secure an animal. The belts can also be used as handles or straps to allow the flexible support to be used for carrying an animal for short distances, such as from the lift to a table.

This invention is ideal for use when an animal in need of care must be picked up and transported to receive that care. If the animal is located where the lift component cannot easily be taken, the cart component can be wheeled or carried to the animal's location. This can be for long distances, over rough terrain since the cart is light and adapted for rough terrain. The legs of the cart can pivot outward by releasing the locking pins on the legs allowing the cart frame to be placed on the ground. The cart's flexible support can be released on one side and the cart can be placed on the ground around the animal. The flexible support can then carefully be pulled under the animal and reattached to the frame of the cart. The cart can then be lifted to allow the curved legs to be secured, by the detent pins, in a vertical position under the frame so the cart can be wheeled back to the lift.

In the event the cart frame cannot be positioned around the animal, the flexible support sheet can be removed entirely from the frame and can be carried to the animal where the sheet can be pulled under the animal. The belts will allow the animal, on the sheet, to be lifted and carried to a location where the sheet can be reattached to the frame of the cart.

With the lift in its lowered position, the cart can be wheeled over the lift. The lift, with the cart and animal thereon can then be wheeled to a vehicle for transportation, or the lift can be moved to a desired location and the lift frame raised to allow for care of the animal. The lift frame can be raised by pushing a foot switch to cause the drive motors to turn the screw gears, aided initially by the push springs. The screw gears, turning in the threads of the drive blocks move the lift arms back towards opposite ends of the frame causing the props to pivot upward. This causes the lift frame, supported by the lift arms and the auxiliary arms, to be raised to the desired level, remaining parallel with the base. The animal can be wheeled on the lift to where it can be treated, or can be treated on the lift. CPR can be performed on the animal because of the resistance provided by the resuscitation board in the pocket of the flexible support.

The cart, if left resting on the lift, can be used to lift and move the animal from the lift to an operating table where the support sheet can be released from the cart, allowing the cart frame to be removed. Or, the support sheet can be released from the cart frame and, by use of its belts, the animal can be lifted and carried on the sheet to an operating table.

While the lift frame can be raised and lowered easily by use of the drive mechanisms, the quick-lift feature described previously can be used to manually raise or lower the lift frame to a desired position. The quick-lift feature can also be used for positioning the lift frame in a non-horizontal position.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, the flexible support sheet of the lift can alternatively be a rigid planar sheet, such as a stainless steel sheet for the purpose of allowing treatment table procedures, including cardio-pulmonary resuscitation.

What is claimed is:

1. An animal litter comprising:

(a) means for manually carting an animal using said litter, wherein said litter further comprises:
  (i) a framework comprising a plurality of connected frame members defining a polygon, wherein the polygon comprises a rectangle;
  (ii) flexible sheet means, stretched by the framework, for vertically supporting a prone animal;
  (iii) a plurality of collapsible means, connected to the framework, for vertically supporting the framework, wherein the plurality of collapsible means comprises:
    (1) a plurality of legs each of which is pivotally connected to a frame member, each leg being individually pivotable to at least three points: a first point being at which said each leg extends outwardly from the polygon and generally in the plane of the polygon to enable the framework to lie flat on a surface; a second point being at which said each leg extends normally from the polygon in a direction to vertically support the polygon; and a third point being at which said each leg extends into the polygon and abuts the sheet means;
    (2) means for releasably locking said each leg at its second point;
  (iv) a plurality of wheels, connected to the collapsible means, for rolling movement of the framework;

(b) means for manually transporting said litter and said animal thereon, and for lifting said litter to a selected level within a range of levels;

(c) joint means for folding the framework in half lengthwise; and (d) means for selectively preventing the framework from folding.

2. An animal litter comprising:

(a) means for manually carting an animal using said litter, wherein said litter further comprises:
  (i) a framework comprising a plurality of connected frame members defining a polygon, wherein the polygon comprises a rectangle;
  (ii) flexible sheet means stretched by the framework, for vertically supporting a prone animal;
  (iii) a plurality of collapsible means, connected to the framework, for vertically supporting the framework, wherein the plurality of collapsible means comprises;
    (1) a plurality of legs each of which is pivotally connected to a frame member, each leg being individually pivotable to at least three points: a first point being at which said each leg extends outwardly from the polygon and generally in the plane of the polygon to enable the framework to lie flat on a surface; a second point being at which said each leg extends normally from the polygon in a direction to vertically support the polygon; and a third point being at which said each leg extends into the polygon and abuts the sheet means, and wherein the plurality of legs comprises a pair of legs disposed to support a front of the rectangle and a pair of wheeled legs disposed to support a rear of the rectangle,
    (2) means for releasably locking said each leg at its second point;
  (iv) a plurality of wheels, connected to the collapsible means, for rolling movement of the framework;

(b) means for manually transporting said litter and said animal thereon, and for lifting said litter to a selected level within a range of levels;

(c) joint means for folding the framework in half lengthwise; and (d) means for selectively preventing the framework from folding.

3. An animal transport cart comprising:

a polygonal shaped frame, said frame comprising at least one joint, wherein said at least one joint allows said frame to be folded in half;

a support sheet that is readily removably attached to said frame, wherein said support sheet is capable of supporting an animal;

at least two wheels attached to said frame; and a locking mechanism, wherein said locking mechanism may be selectively engaged to prevent said frame from folding in half.

4. The animal transport cart of claim 3, further comprising at least one belt attached to said frame or said support sheet.

5. The animal transport cart of claim 4, wherein said at least one belt is a strap that is capable of strapping the animal to said support sheet.

6. The animal transport cart of claim 4, wherein said at least one belt is a strap that is capable of being used to move said support sheet.

7. The animal transport cart of claim 3, further comprising a handle, wherein said handle is attached to said sheet.

8. The animal transport cart of claim 3, further comprising a handle, wherein said handle is attached to said frame.

9. The animal transport cart of claim 8, wherein said handle is pivotally attached to said frame.

10. The animal transport cart of claim 9, further comprising a locking mechanism to lock said handle in a desired position.

11. The animal transport cart of claim 10, wherein said handles comprises a grip.

12. The animal transport cart of claim 3, further comprising snaps, wherein said snaps allows said support sheet to be removably attached to said frame.

13. An animal transport cart comprising:

a polygonal shaped frame, said frame comprising at least one joint, wherein said at least one joint allows said frame to be folded in half;

a support sheet that is removably attached to said frame, wherein said support sheet is capable of supporting an animal;

at least two wheels attached to said frame; and a locking mechanism, wherein said locking mechanism may be selectively engaged to prevent said frame from folding in half, wherein said locking mechanism comprises at least one sleeve that moves over said at least one joint.

14. The animal transport cart of claim 3, further comprising a rigid board, wherein said rigid board provides additional support to said support sheet.

15. The animal transport cart of claim 14, wherein said rigid board is attached to said support sheet.

16. The animal transport cart of claim 3, wherein said support sheet is removed and is capable of being placed under the animal and reattached to said frame while the animal is being held by said support sheet.

17. The animal transport cart of claim 3, wherein said frame may be lifted to a desired position by a lifting mechanism.

18. The animal transport cart of claim 17, wherein said lifting mechanism is a lift frame that is manually engaged.

19. The animal transport cart of claim 17, wherein said lifting mechanism is a lift frame that is electronically engaged.

20. The animal transport cart of claim 3, wherein said frame is substantially in one plane when said locking mechanism is engaged.

21. The animal transport cart of claim 3, wherein said support sheet is capable of being cleaned and reused.

22. An animal transport cart comprising:

a polygonal shaped frame, wherein said frame is substantially in one plane, said frame comprising at least one joint, wherein said at least one joint allows said frame to be folded in half;

a support sheet that is readily removably attached to said frame, wherein said support sheet is capable of supporting an animal and said support sheet is removably attached to said frame with snaps, wherein said snaps comprise mating portions wherein one of said mating portions is attached to said frame and the other of said mating portions is attached to said support sheet;

at least one belt attached to said frame or said support sheet for strapping the animal to said support sheet;

a handle pivotally attached to said frame;

at least two wheels attached to said frame; and a locking mechanism, wherein said locking mechanism may be selectively engaged to prevent said frame from folding in half.

23. The animal transport cart of claim 22, wherein said handle comprises a grip.

24. The animal transport cart of claim 22, further comprising at least one handle attached to said support sheet.

25. The animal transport cart of claim 22, further comprising a locking mechanism to lock said handle pivotally attached to said frame in a desired position.

* * * * *

UNITED STATES PATENT AND TRADEMARK OFFICE

CERTIFICATE OF CORRECTION

PATENT NO. : 6,199,508 B1 Page 1 of 1
DATED : March 13, 2001
INVENTOR(S) : Theresa Miale, Gloria L. Miale, Michael Mulvany, William Pantos It is certified that error appears in the above-identified patent and that said Letters Patent is hereby corrected as shown below:

Title page,
Item [75], Inventors on the face of the patent, "Michael Molvaney" should be changed to -- Michael Mulvany --.

Signed and Sealed this

Thirtieth Day of October, 2001

*Attest:*

Nicholas P. Godici

NICHOLAS P. GODICI

*Attesting Officer* *Acting Director of the United States Patent and Trademark Office*